(12) United States Patent
Inao et al.

(10) Patent No.: US 10,030,794 B2
(45) Date of Patent: Jul. 24, 2018

(54) CORRUGATED TUBE AND WIRE HARNESS

(71) Applicant: YAZAKI CORPORATION, Tokyo (JP)

(72) Inventors: Shinichi Inao, Shizuoka (JP); Hidehiko Kuboshima, Shizuoka (JP); Hideomi Adachi, Shizuoka (JP); Kenta Yanazawa, Shizuoka (JP); Hiroyuki Yoshida, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/377,302

(22) Filed: Dec. 13, 2016

(65) Prior Publication Data

US 2017/0167640 A1    Jun. 15, 2017

(30) Foreign Application Priority Data

Dec. 14, 2015    (JP) .................................. 2015-242892

(51) Int. Cl.
| | | |
|---|---|---|
| *F16L 11/15* | (2006.01) | |
| *H02G 3/04* | (2006.01) | |
| *H01B 7/00* | (2006.01) | |
| *B60R 16/02* | (2006.01) | |

(52) U.S. Cl.
CPC .......... *F16L 11/15* (2013.01); *B60R 16/0215* (2013.01); *H01B 7/0045* (2013.01); *H02G 3/0468* (2013.01)

(58) Field of Classification Search
CPC .... H02G 3/0468; H01L 37/0045; F16L 11/15; B60R 16/0215
See application file for complete search history.

(56) References Cited

U.S. PATENT DOCUMENTS

| 3,672,196 A | 6/1972 | Levacher et al. |
| 3,785,189 A | 1/1974 | Ksselbom et al. |
| (Continued) | | |

FOREIGN PATENT DOCUMENTS

| JP | S5017029 B1 | 6/1975 |
| JP | H101130019 U | 9/1989 |
| (Continued) | | |

OTHER PUBLICATIONS

Japanese Office Action for the related Japanese Patent Application No. 2015-242892 dated Mar. 20, 2018.

*Primary Examiner* — William H Mayo, III
*Assistant Examiner* — Hiram E Gonzalez
(74) *Attorney, Agent, or Firm* — Kenealy Vaidya LLP

(57) ABSTRACT

A corrugated tube includes: a tubular body including outer-face bellows recess sections outer-face bellows protruding sections in a circumferential direction as viewed from an outside, wherein the outer-face bellows recess section and the outer-face bellows protruding section are alternately arranged continuously in an axial direction of the tubular body. Deep groove sections are formed in some of the outer-face bellows recess sections. The deep groove section has: a shape being recessed partially in a predetermined range in the circumferential direction; a shape protruding toward an inner side of the tubular body; and a shape having a pair of tapered sections as viewed from the axial direction of the tubular body.

12 Claims, 13 Drawing Sheets

(56) References Cited

U.S. PATENT DOCUMENTS

| | | | | |
|---|---|---|---|---|
| 4,592,231 | A | * | 6/1986 | Kant ................. G01F 23/268 |
| | | | | 138/121 |
| 5,706,864 | A | * | 1/1998 | Pfleger ................. B32B 1/08 |
| | | | | 138/121 |
| 5,792,532 | A | * | 8/1998 | Pfleger ................ F16L 11/118 |
| | | | | 138/121 |
| 6,078,009 | A | * | 6/2000 | Kawamura .......... H02G 3/0468 |
| | | | | 138/162 |
| 6,116,289 | A | * | 9/2000 | Hayashi ................ F16L 11/11 |
| | | | | 138/121 |
| 7,435,899 | B2 | * | 10/2008 | Okada ................ H02G 3/0468 |
| | | | | 174/36 |
| 8,770,230 | B2 | * | 7/2014 | Steinhanses .......... F16L 13/148 |
| | | | | 138/109 |
| 2007/0102182 | A1 | | 5/2007 | Okada et al. |
| 2011/0297415 | A1 | | 12/2011 | Katou et al. |

FOREIGN PATENT DOCUMENTS

| | | |
|---|---|---|
| JP | H107241925 A | 9/1995 |
| JP | H108100873 A | 4/1996 |
| JP | H108270843 A | 10/1996 |
| JP | 2007159198 A | 6/2007 |
| JP | 2011-254614 A | 12/2011 |
| JP | 2015042040 A | 3/2015 |
| WO | 2005088796 A1 | 9/2005 |

\* cited by examiner

CORRUGATED TUBE AND WIRE HARNESS

CROSS-REFERENCE TO RELATED APPLICATION(S)

This application is based on and claims priority from Japanese Patent Application (Application No. 2015-242892) filed on Dec. 14, 2015, the entire contents of which are incorporated herein by reference.

BACKGROUND

1. Field of the Invention

The present invention relates to a corrugated tube and a wire harness equipped with this corrugated tube.

2. Description of Related Art

Wire harnesses are used to electrically connect devices mounted on automobiles. A wire harness is configured so as to be equipped with a corrugated tube and one or more conductive paths to be accommodated in this corrugated tube. For example, in the wire harness according to JP-A-2011-254614 described below, the wire harness is routed along the vehicle underfloor of an automobile. The portion of the wire harness provided along the vehicle underfloor is routed straight. The wire harness being used in this way is formed so as to be long. According to JP-A-2011-254614 described below, it is found that the following problem may occur at the portion of the wire harness being routed straight. That is to say, it is found that the conductive path inside the corrugated tube is deflected, for example, due to vibration during travelling.

SUMMARY

The above-mentioned conventional technology has a problem that, if the conductive path inside the corrugated tube is deflected significantly due to vibration during travelling, the coating (the braid or the metal foil on the outside of the conductive path in the case that a shielding function is provided) of the conductive path may intensely make contact with the inner face of the corrugated tube and may be damaged.

In consideration of the above-mentioned circumstances, an object of the present invention is to provide a corrugated tube capable of suppressing the deflection of the conductive path and a wire harness equipped with this corrugated tube.

In a first aspect of the present invention, there is provided a corrugated tube including: a tubular body including outer-face bellows recess sections outer-face bellows protruding sections in a circumferential direction as viewed from an outside, wherein the outer-face bellows recess section and the outer-face bellows protruding section are alternately arranged continuously in an axial direction of the tubular body, wherein deep groove sections are formed in some of the outer-face bellows recess sections, and wherein the deep groove section has: a shape being recessed partially in a predetermined range in the circumferential direction; a shape protruding toward an inner side of the tubular body; and a shape having a pair of tapered sections as viewed from the axial direction of the tubular body.

In a second aspect of the present invention, there is provided the corrugated tube according to the first aspect, wherein in a case in which the deep groove sections are arranged in the axial direction of the tubular body, the deep groove sections are formed and disposed such that depths thereof change gradually in the axial direction of the tubular body.

In a third aspect of the present invention, there is provided the corrugated tube according to the first or second aspect, wherein in a case in which the deep groove sections are arranged in the axial direction of the tubular body, reinforcing sections having a rib shape as viewed from the outside of the tubular body are formed at the deep groove sections.

In a fourth aspect of the present invention, there is provided a wire harness including: a corrugated tube a tubular body including outer-face bellows recess sections outer-face bellows protruding sections in a circumferential direction as viewed from an outside, wherein the outer-face bellows recess section and the outer-face bellows protruding section are alternately arranged continuously in an axial direction of the tubular body, and one or more conductive paths inserted into the tubular body, wherein deep groove sections are formed in some of the outer-face bellows recess sections in the tubular body, and wherein the deep groove section has: a shape being recessed partially in a predetermined range in the circumferential direction; a shape protruding toward an inner side of the tubular body; and a shape having a pair of tapered sections as viewed from the axial direction of the tubular body.

With the first aspect of the present invention, the deep groove sections are formed in some of the plurality of outer-face bellows recess sections, whereby portions protruding to the inner side of the corrugated tube can be generated. Hence, the first aspect of the present invention exhibits an advantage capable of suppressing the deflection of the conductive path provided inside the corrugated tube, for example, even during travelling, by holding the conductive path using the portions protruding to the inner side. Furthermore, since the deflection of the conductive path can be suppressed, the first aspect of the present invention also exhibits an advantage capable of preventing the coating (the braid or the metal foil on the outside of the conductive path in the case that a shielding function is provided) of the conductive path from being damaged. Moreover, by the formation of tapers at the deep groove sections, tapered sections are also generated at the portions protruding to the inner side of the corrugated tube, whereby the first aspect of the present invention also exhibits an advantage capable of reducing the contact load of the conductive path when the conductive path is inserted into the corrugated tube.

The second aspect of the present invention exhibits the following advantages in addition to the advantages of the first aspect. That is to say, since the deep groove sections of the corrugated tube are formed so that their depths change gradually in the axial direction of the tube, the conductive path is hardly caught during the work for inserting the conductive path into the corrugated tube, whereby the second aspect of the present invention exhibits an advantage capable of improving the insertion workability of the conductive path. What's more, since the insertion workability can be improved, the second aspect of the present invention exhibits an advantage that the insertion of the conductive path can be performed using an automatic machine.

The third aspect of the present invention exhibits the following advantage in addition to the advantages of the first aspect or the second aspect. That is to say, since the reinforcing sections having a rib shape as viewed from the outside of the corrugated tube are formed at the deep groove sections, the third aspect of the present invention can adjust the rigidity between the outer-face bellows recess sections provided with the deep groove sections and the other outer-face bellows recess sections not provided with the deep groove sections. For example, it is possible to adjust the rigidity so that even the portions provided with the deep groove sections have rigidity (easiness/hardness of bending) similar to that of the portions not provided with the deep groove sections.

Since the wire harness according to the fourth aspect is configured so as to include the corrugated tube according to the first aspect, the present invention according to the fourth aspect can exhibit the above-mentioned advantages. Consequently, the fourth aspect of the present invention can exhibit an advantage capable of providing an improved wire harness.

BRIEF DESCRIPTION OF THE DRAWINGS

FIG. 1A is a schematic view showing a state of routing a high-voltage wire harness, and FIG. 1B is a schematic view showing a state of routing a low-voltage wire harness different from that shown in FIG. 1A (Embodiment 1);

DETAILED DESCRIPTION

A wire harness is configured so as to include a corrugated tube made of a resin and having a bellows tube shape and one or more conductive paths to be inserted into this corrugated tube. The corrugated tube has a plurality of recess sections on the outer face of the bellows, and deep groove sections are formed in some of the recess sections on the outer face of the bellows. The deep groove section is formed into a shape being recessed partially in a predetermined range in the circumferential direction of the corrugated tube, protruding to the inner side of the corrugated tube, and having tapered sections as viewed from the axial direction of the corrugated tube.

Embodiment 1

Figure 1A:
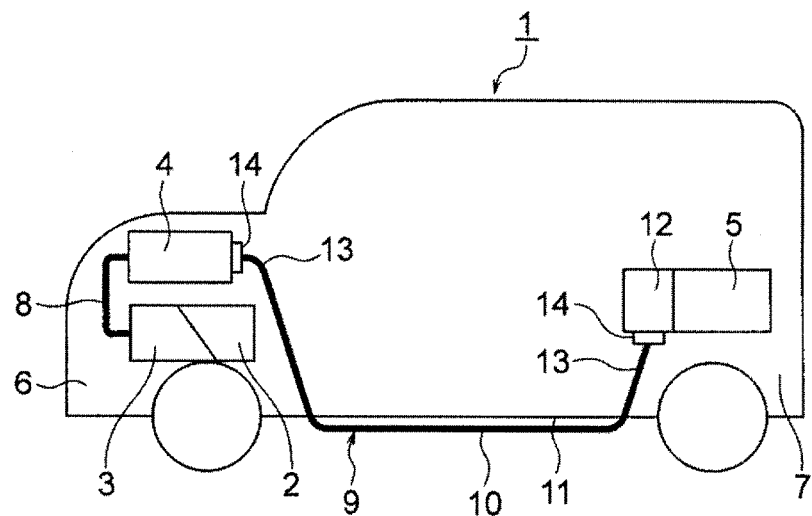
FIGS. 1A and 1B are views showing wire harnesses according to a first embodiment of the present invention.
Figure 1B:
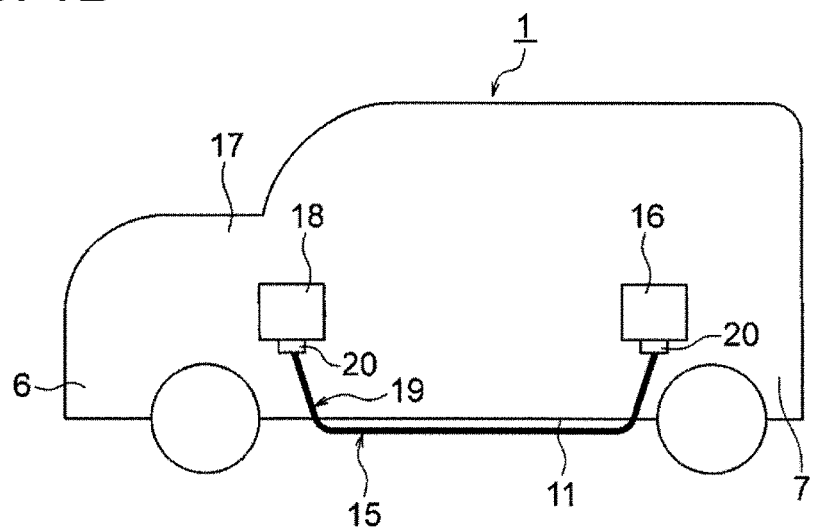
Figure 2:
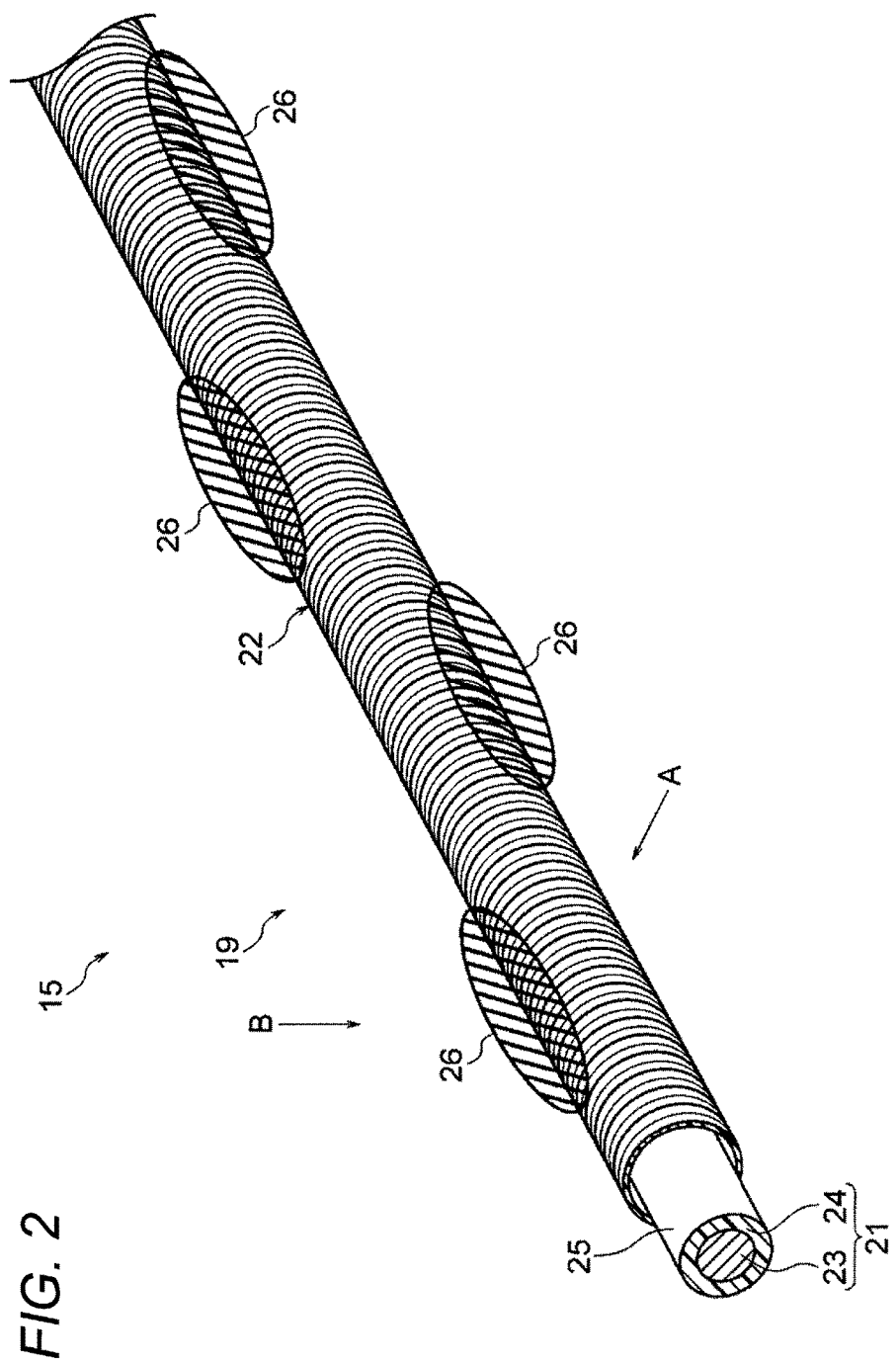
FIG. 2 is a perspective view showing the configuration of the wire harness according to the first embodiment of the present invention and showing the positions where the deep groove sections of the corrugated tube according to the first embodiment of the present invention are formed (Embodiment 1)
Figure 3:
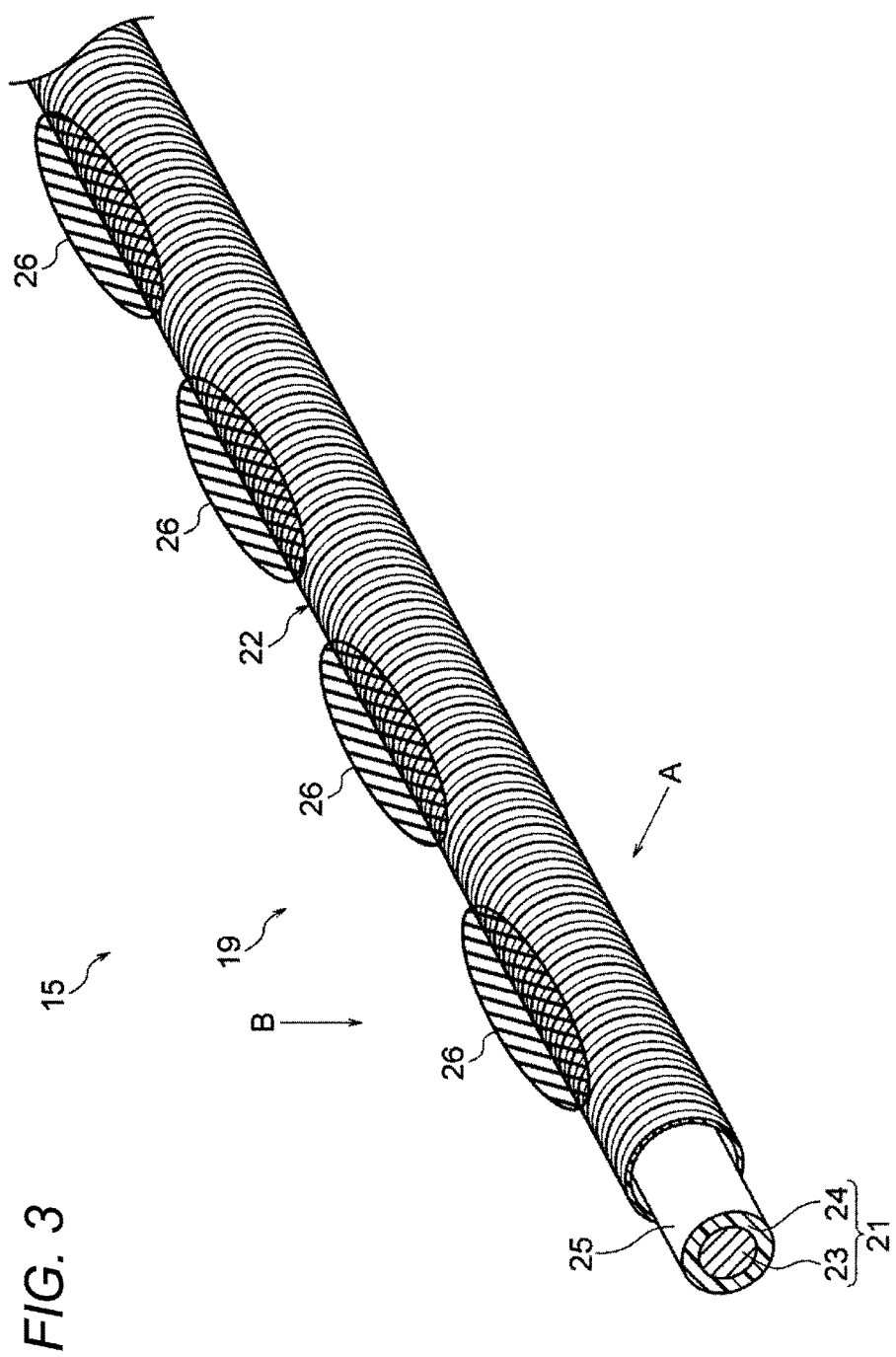
FIG. 3 is a perspective view showing the configuration of the wire harness according to the first embodiment of the present invention and showing the positions where the deep groove sections of the corrugated tube according to the first embodiment of the present invention are formed (Embodiment 1)
Figure 4:
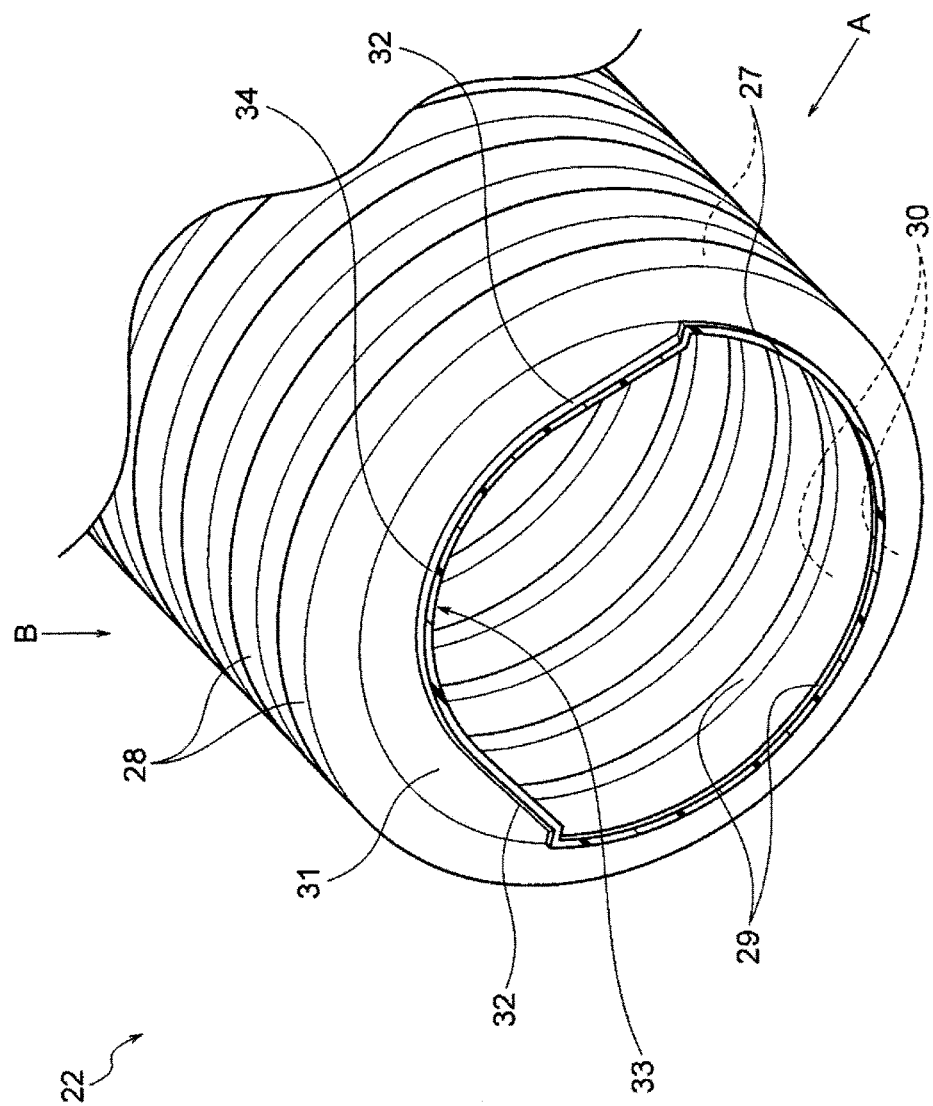
FIG. 4 is a perspective view showing the corrugated tube shown in FIG. 2, being cross-sectioned at the position where the deep groove section is formed (Embodiment 1)
Figure 5:
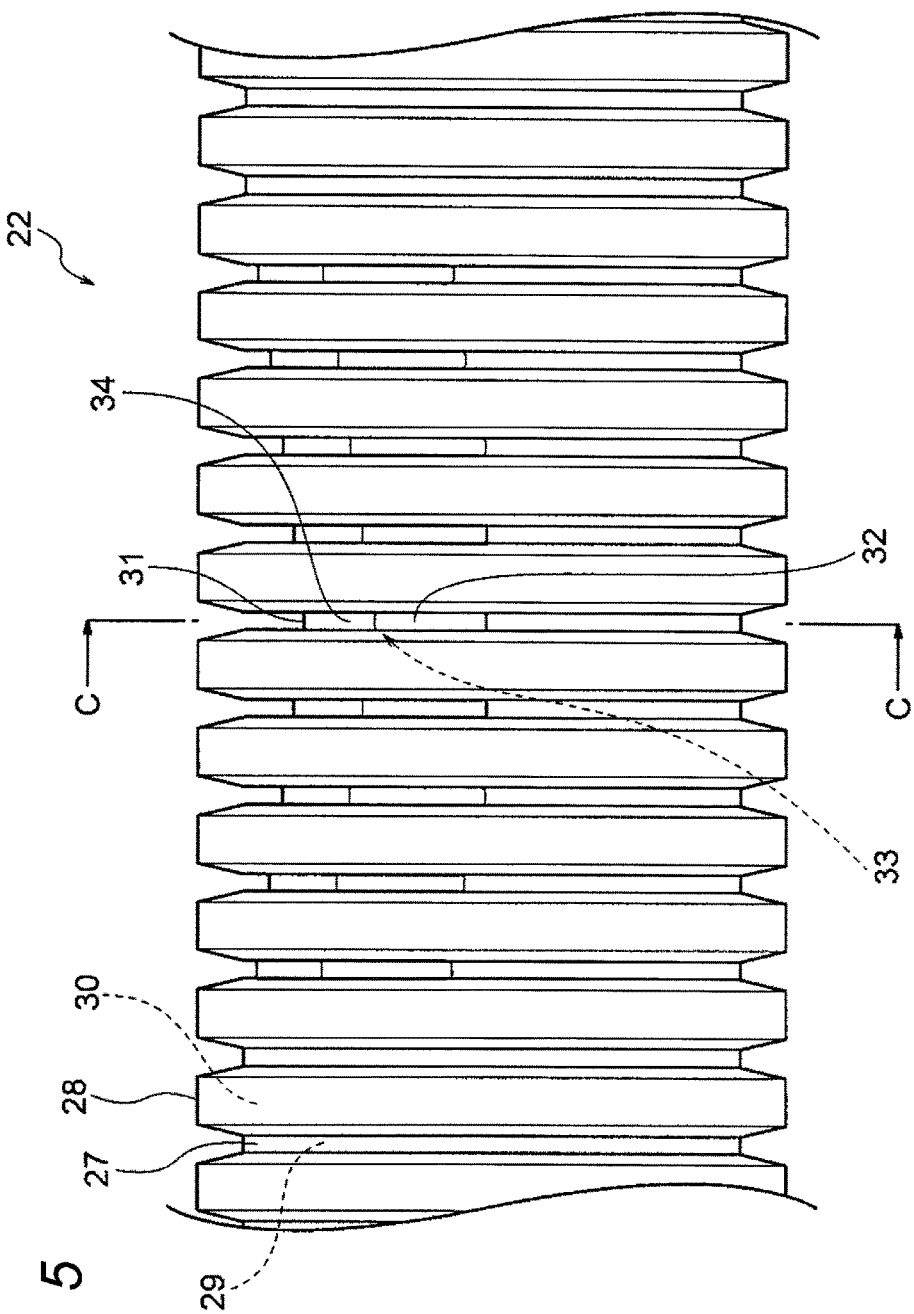
FIG. 5 is a view showing the corrugated tube shown in FIG. 2, as viewed from arrow A (Embodiment 1)
Figure 6:
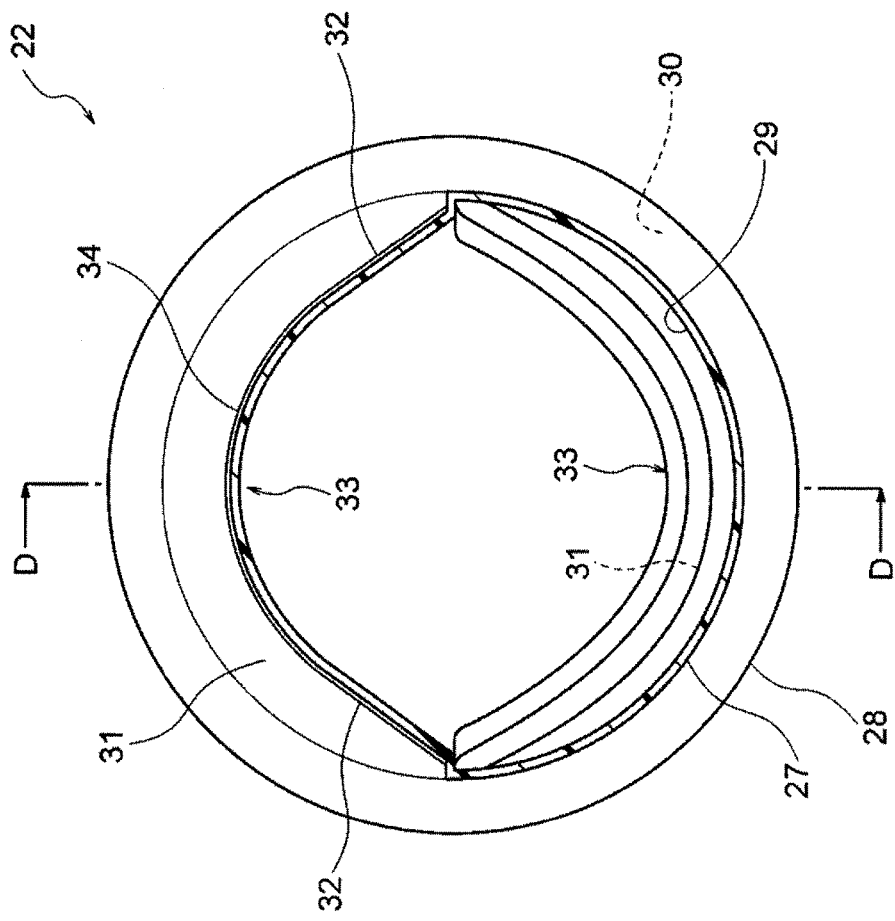
FIG. 6 is a cross-sectional view taken on line C-C of FIG. 5 (Embodiment 1)
Figure 7:
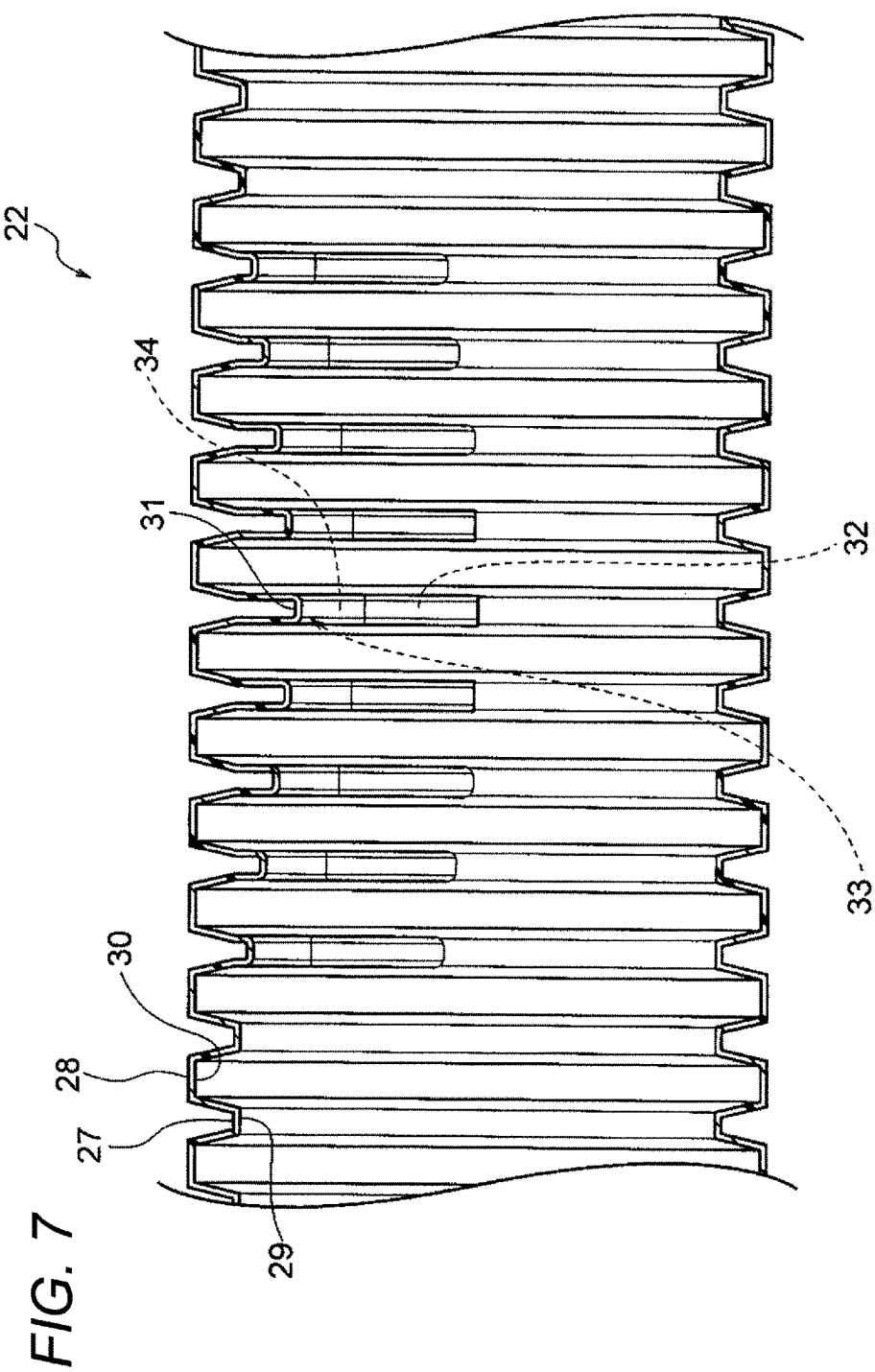
FIG. 7 is a cross-sectional view taken on line D-D of FIG. 6 (Embodiment 1)

Embodiment 1 will be described below referring to the accompanying drawings. FIGS. 1A and 1B are views showing wire harnesses according to the first embodiment of the present invention; FIG. 1A is a schematic view showing a state of routing a high-voltage wire harness, and FIG. 1B is a schematic view showing a state of routing a low-voltage wire harness different from that shown in FIG. 1A. Furthermore, FIGS. 2 and 3 are perspective views showing the configuration of the wire harness according to the first embodiment of the present invention and showing the positions where the deep groove sections of the corrugated tube according to the first embodiment of the present invention are formed. Moreover, FIG. 4 is a perspective view showing the corrugated tube shown in FIG. 2, being cross-sectioned at the position where the deep groove section is formed, FIG. 5 is a view showing the corrugated tube shown in FIG. 2, as viewed from arrow A, FIG. 6 is a cross-sectional view taken on line C-C of FIG. 5, and FIG. 7 is a cross-sectional view taken on line D-D of FIG. 6.

In this embodiment, the present invention is adopted to a wire harness to be routed in a hybrid automobile (an electric automobile, a general automobile traveling using an engine, etc. may be used).

<Hybrid Automobile 1>

In FIG. 1A, the reference numeral 1 designates a hybrid automobile. The hybrid automobile 1 is a vehicle driven by two mixed drive power sources, i.e., an engine 2 and a motor unit 3. Electric power is supplied to the motor unit 3 from a battery 5 (a battery pack) via an inverter unit 4. In this embodiment, the engine 2, the motor unit 3 and the inverter unit 4 are mounted in the engine room 6 of the automobile in which, for example, the front wheels are provided. In addition, the battery 5 is mounted in the rear section 7 of the automobile in which, for example, the rear wheels are provided (the battery 5 may be mounted inside the passenger compartment provided behind the engine room 6).

The motor unit 3 is connected to the inverter unit 4 using a high-tension wire harness 8 (high-voltage motor cable). Furthermore, the battery 5 is also connected to the inverter unit 4 using a high-tension wire harness 9. The intermediate section 10 of the wire harness 9 is routed along the vehicle underfloor 11 (in the vehicle body) of the vehicle. Furthermore, the intermediate section 10 is routed nearly parallel to the vehicle underfloor 11. The vehicle underfloor 11 is a known body (vehicle body), that is, the so-called panel member, and is provided with through holes at predetermined positions. The wire harness 9 is inserted into these through holes water-tightly.

The wire harness 9 is connected to the battery 5 via a junction block 12 provided on the battery 5. An external connection device, such as a shield connector 14, disposed at the harness terminal 13 on the rear end side of the wire harness 9 is electrically connected to the junction block 12. Furthermore, the wire harness 9 is electrically connected to the inverter unit 4 via an external connection device, such as a shield connector 14, disposed at the harness terminal 13 on the front end side of the wire harness 9.

The motor unit 3 is configured so as to include a motor and a generator. Furthermore, the inverter unit 4 is configured so as to include an inverter and a converter. The motor unit 3 is formed as a motor assembly including a shield case.

Moreover, the inverter unit 4 is also formed as an inverter assembly including a shield case. The battery 5 is a Ni-MH or Li-ion battery and is modularized. However, for example, a power storage device, such as a capacitor, can also be used. The battery 5 is not particularly limited, provided that it can be used for the hybrid automobile 1 and an electric automobile, as a matter of course.

In FIG. 1B, the reference numeral 15 designates a wire harness. The wire harness 15 is a low-tension (low-voltage) type and is provided to electrically connect a low-voltage battery 16 at the rear section 7 in the hybrid automobile 1 to an auxiliary device 18 (device) mounted at the front section 17 of the automobile. As in the case of the wire harness 9 shown in FIG. 1A, the wire harness 15 is routed along the vehicle underfloor 11 (this route is taken as an example, and the wire harness may be routed along the passenger compartment).

As shown in FIGS. 1A and 1B, the high-tension wire harnesses 8 and 9 and the low-tension wire harness 15 are routed in the hybrid automobile 1. Although the present invention is applicable to both the types of wire harnesses, the low-tension wire harness 15 is taken as a typical example and will be described below.

<Wire Harness 15>

In FIG. 1B, the long wire harness 15 routed along the vehicle underfloor 11 is configured so as to be equipped with a harness body 19 and connectors 20 respectively disposed at both the terminals of this harness body 19. In addition, the wire harness 15 is also configured so as to be equipped with fixing members (for example, clamps) for routing the wire harness itself to predetermined positions and water sealing members (for example, grommets), not shown.

<Harness Body 19>

In FIGS. 2 and 3, the harness body 19 is configured so as to be equipped with a conductive path 21 and a corrugated tube 22 according to the first embodiment of the present invention for accommodating and protecting the conductive path 21. Although the conductive path 21 being one in number is shown in FIGS. 2 and 3, the number is taken as an example. That is to say, the number of the conductive paths 21 may be plural. Furthermore, a corrugated tube for accommodating and protecting the wire harness 15 together with the high-tension wire harness 9 may be adopted as the corrugated tube 22. First, the conductive path 21 in the harness body 19 will be described first and then the corrugated tube 22 according to the first embodiment of the present invention will be described.

<Conductive Path 21>

In FIGS. 2 and 3, the conductive path 21 is configured so as to be equipped with a conductive conductor 23 and an insulating insulator 24 for covering the conductor 23. The conductor 23 is made of copper or a copper alloy, or aluminum or an aluminum alloy, and is formed into a circular shape in cross section. The conductor 23 may have either one of a structure in which strands are twisted and a rod-shaped structure having a rectangular or circular (round) shape in cross section (for example, a flat single-core or round single-core structure; in this case, the electric wire itself has a rod shape). The insulator 24 made of an insulating resin material is extrusion-molded to the outer face of the above-mentioned conductor 23.

The insulator 24 is extrusion-molded to the outer circumferential face of the conductor 23 by using a thermoplastic resin. The insulator 24 is formed as a coating having a circular shape in cross section. The insulator 24 is also formed so as to have a predetermined thickness. As the above-mentioned thermoplastic resin, various kinds of resins can be used. For example, a resin is suitably selected from among polymer materials, such as polyvinyl chloride resin, polyethylene resin and polypropylene resin. The reference numeral 25 designates the outer circumferential face of the conductive path 21 (corresponding to the outer circumferential face of the insulator 24).

<Corrugated Tube 22>

In FIGS. 2 and 3, the corrugated tube 22 is formed into a single straight tube having a bellows shape by resin molding (the corrugated tube is straight before its use; the corrugated tube is not limited to be made of a resin, but may be made of a metal, provided that characteristic portions according to the first embodiment of the present invention can be formed). In other words, the corrugated tube 22 includes or formed by a tubular body. In addition, the corrugated tube 22 is formed into a shape having no split. In other words, the corrugated tube 22 is formed into a shape having no slit (formed into a shape different from the shape of a split tube). Furthermore, the corrugated tube 22 is formed into a circular shape in cross section (although a perfect circular shape is used in this embodiment, the shape is taken as an example; the shape may be, for example, an oval shape, an elliptical shape or a rectangular shape in cross section).

The corrugated tube 22 has a bellows tube shape as described above, thereby being formed so as to have flexibility. The bellows tube shape of the corrugated tube 22 and the characteristic portions of the first embodiment of the present invention will be described below. The characteristic portions according to the first embodiment of the present invention are formed and disposed at deep groove forming positions 26 enclosed with thick lines in the figures. In the case of FIG. 2, the deep groove forming positions 26 are disposed zigzag on the upper and lower sides of the figure, and in the case of FIG. 3, they are disposed so as to be arranged on the upper side of the figure. However, they may be disposed so as to be arranged in a spiral shape although the spiral shape is not shown in the figures. The deep groove forming positions 26 are disposed at a predetermined pitch along the axial direction of the corrugated tube 22.

<Bellows Tube Shape>

In FIGS. 4 to 7, the bellows tube shape is referred to as a shape having recess sections 27 on the outer face of the bellows and having protruding sections 28 on the outer face of the bellows in the circumferential direction as viewed from the outside and is also referred to as a shape in which the recess section 27 on the outer face of the bellows and the protruding section 28 on the outer face of the bellows are alternately arranged continuously in the axial direction of the tube. The recess sections 27 on the outer face of the bellows and the protruding sections 28 on the outer face of the bellows are respectively formed so as to be plural in number (one hundred or more sections are formed in this embodiment). The recess section 27 on the outer face of the bellows is formed so as to have the shape of a protruding section 29 on the inner face of the bellows as viewed from the inside. Furthermore, the protruding section 28 on the outer face of the bellows is formed so as to have the shape of a recess section 30 on the inner face of the bellows as viewed from the inside. It is assumed that the wall thickness of the bellows tube shape is set appropriately.

<Deep Groove Sections 31>

In FIGS. 4 to 7, deep groove sections 31 are formed in some of the numerous recess sections 27 on the outer face of the bellows. In this embodiment, the deep groove sections 31 being nine in number are formed at each deep groove forming position 26 (see FIG. 2) (the number is taken as an example). The deep groove section 31 is formed into a shape being recessed partially in a predetermined range in the circumferential direction (see the range shown in the figures), protruding more than the protruding section 29 on the inner face of the bellows on the inner side of the corrugated tube 22, and having a pair of tapered sections 32 as viewed from the axial direction of the corrugated tube 22.

The nine deep groove sections 31 are formed and disposed so as to be arranged in the axial direction of the corrugated tube 22. The nine deep groove sections 31 configured as described above are formed and disposed in a state in which their depths change gradually in the axial direction of the tube. More specifically, the deep groove sections 31 are formed and disposed in a state in which the their depths are adjusted so that the depths of the first to fifth deep groove sections 31 become gradually larger and so that the depths of the fifth to ninth deep groove sections 31 become gradually smaller. The nine deep groove sections 31 are formed so that a large protruding section 33 is, as it were, generated as viewed from the inside of the corrugated tube 22. The large protruding section 33 functions as a portion for suppressing the deflection of the conductive path 21 (see FIG. 2).

The inner face side of the corrugated tube is formed as described below by forming the pair of tapered sections 32. That is to say, the pair of tapered sections 32 is formed as a portion that reduces the contact load of the conductive path 21 when the conductive path 21 (see FIG. 2) is inserted into the corrugated tube 22. One ends of the pair of tapered sections 32 are arranged continuously to the recess section 27 on the outer face of the bellows and the other ends thereof are jointed by a circular arc section 34. The deflection of the conductive path 21 can also be suppressed even in the case that the circular arc section 34 is extended without forming the pair of tapered sections 32. However, the case in which the pair of tapered sections 32 is formed is more effective than the case without the tapered sections 32 in consideration of the insertion work for inserting the conductive path 21.

Effects of Embodiment 1

In the configuration and structure as described above, the plurality of deep groove sections 31 is formed at each of the deep groove forming positions 26 in the corrugated tube 22. Hence, when the conductive path 21 is inserted from the opening on one end side of the corrugated tube 22 to the opening on the other end side thereof, the conductive path 21 moves such that the direction of the conductive path 21 is changed to the side away from the deep groove forming positions 26. When the conductive path 21 is inserted and set in a state in which the conductive path 21 is completely accommodated in the corrugated tube 22 and protected thereby (see FIG. 2), the conductive path 21 is held by the plurality of deep groove sections 31. In other words, the conductive path 21 is held by the large protruding section 33 generated by the nine deep groove sections 31 and the inner face of the corrugated tube 22.

Summary and Advantages of Embodiment 1

As described above referring to FIGS. 1 to 7, the harness body 19 of the wire harness 15 is configured so as to include the corrugated tube 22 having a bellows tube shape and the conductive path 21 to be inserted into the corrugated tube 22. The corrugated tube 22 has the plurality of recess sections 27 on the outer face of the bellows, and the deep groove sections 31 are formed in some of the recess sections 27 on the outer face of the bellows. The deep groove section 31 is formed into a shape being recessed partially in the predetermined range in the circumferential direction of the corrugated tube 22, protruding to the inner side of the corrugated tube 22, and having the pair of tapered sections 32 as viewed from the axial direction of the corrugated tube 22. Hence, the deep groove sections 31 configured as described above can make the conductive path 21 having been inserted into the corrugated tube 22 hardly movable and can hold the conductive path 21 so that the conductive path 21 does not move.

Consequently, the corrugated tube 22 and the wire harness 15 according to the first embodiment of the present invention exhibit advantages capable of suppressing the movement of the conductive path 21 and capable of preventing the conductive path 21, for example, from being scraped.

In addition, the corrugated tube 22 and the wire harness 15 according to the first embodiment of the present invention exhibit an advantage capable of reducing the contact load of the conductive path 21 when the conductive path 21 is inserted into the corrugated tube 22 because the pair of tapered sections 32 is formed in the deep groove section 31 and because the portion of the deep groove section 31 protruding to the inner side of the corrugated tube 22 is not formed into a portion having a simple circular arc shape.

Embodiment 2

Figure 8:
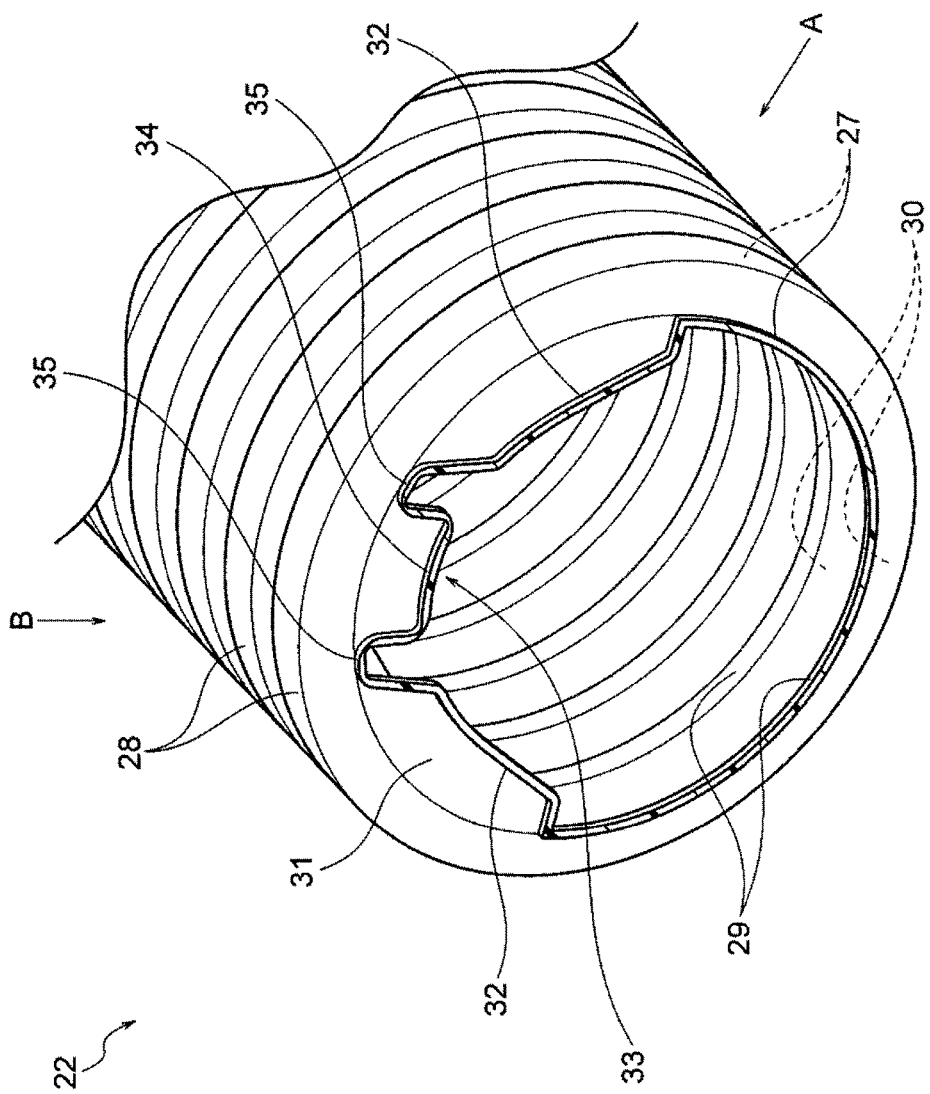
FIG. 8 is a perspective view showing a corrugated tube serving as another example, being cross-sectioned at the position where a deep groove section is formed (Embodiment 2)
Figure 9:
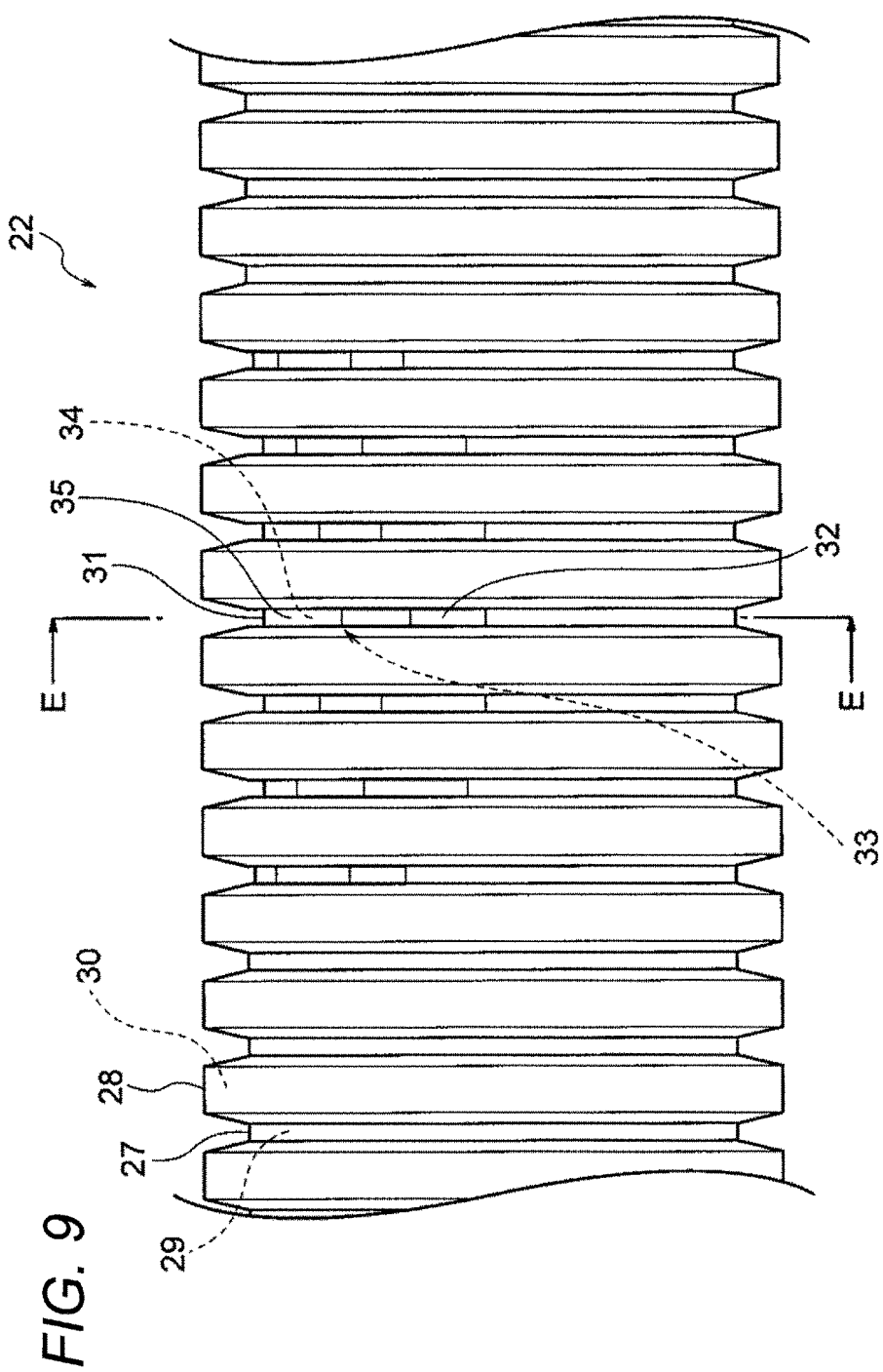
FIG. 9 is a view showing the corrugated tube shown in FIG. 8, as viewed from arrow A (Embodiment 2)
Figure 10:
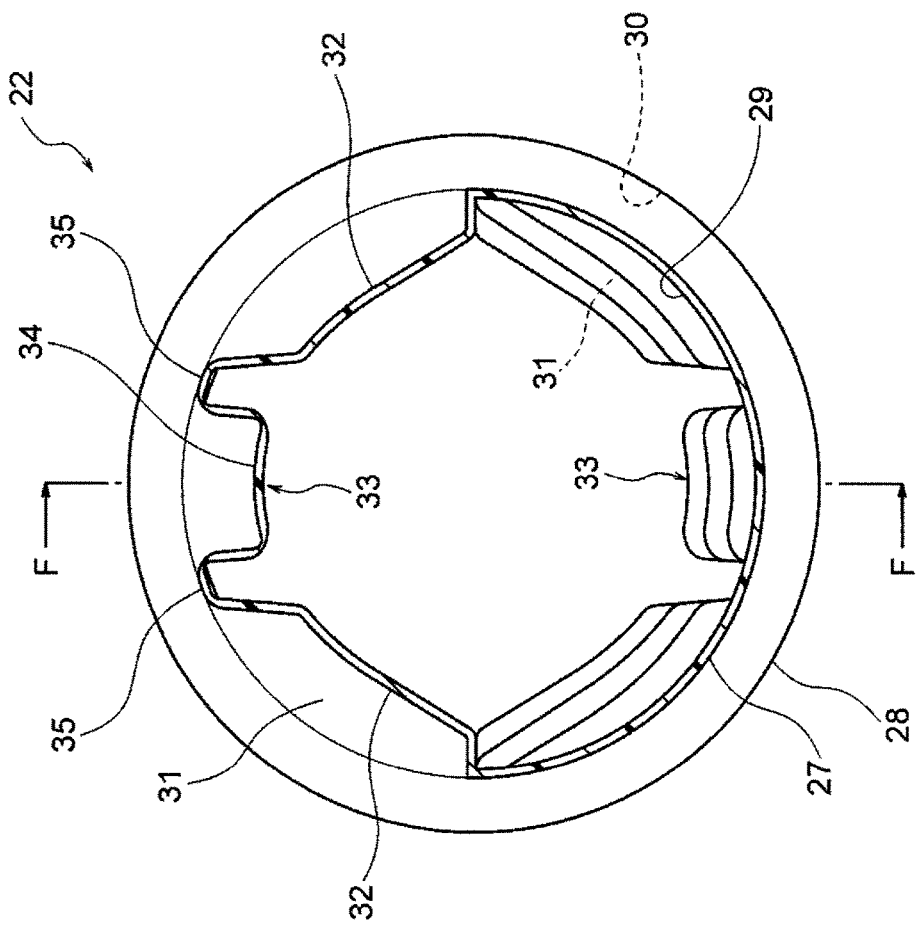
FIG. 10 is a cross-sectional view taken on line E-E of FIG. 9 (Embodiment 2)
Figure 11:
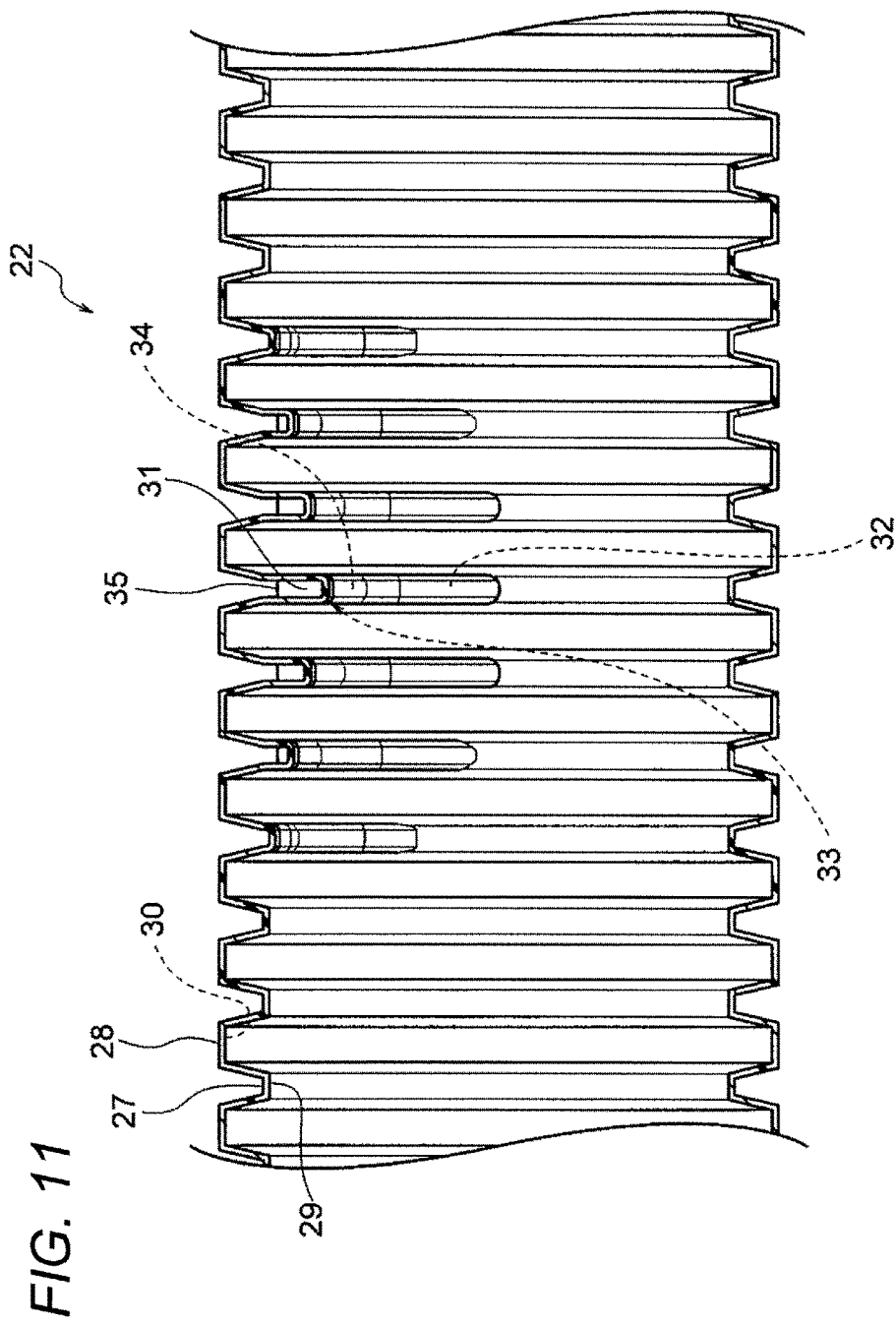
FIG. 11 is a cross-sectional view taken on line F-F of FIG. 10 (Embodiment 2)
Figure 12:
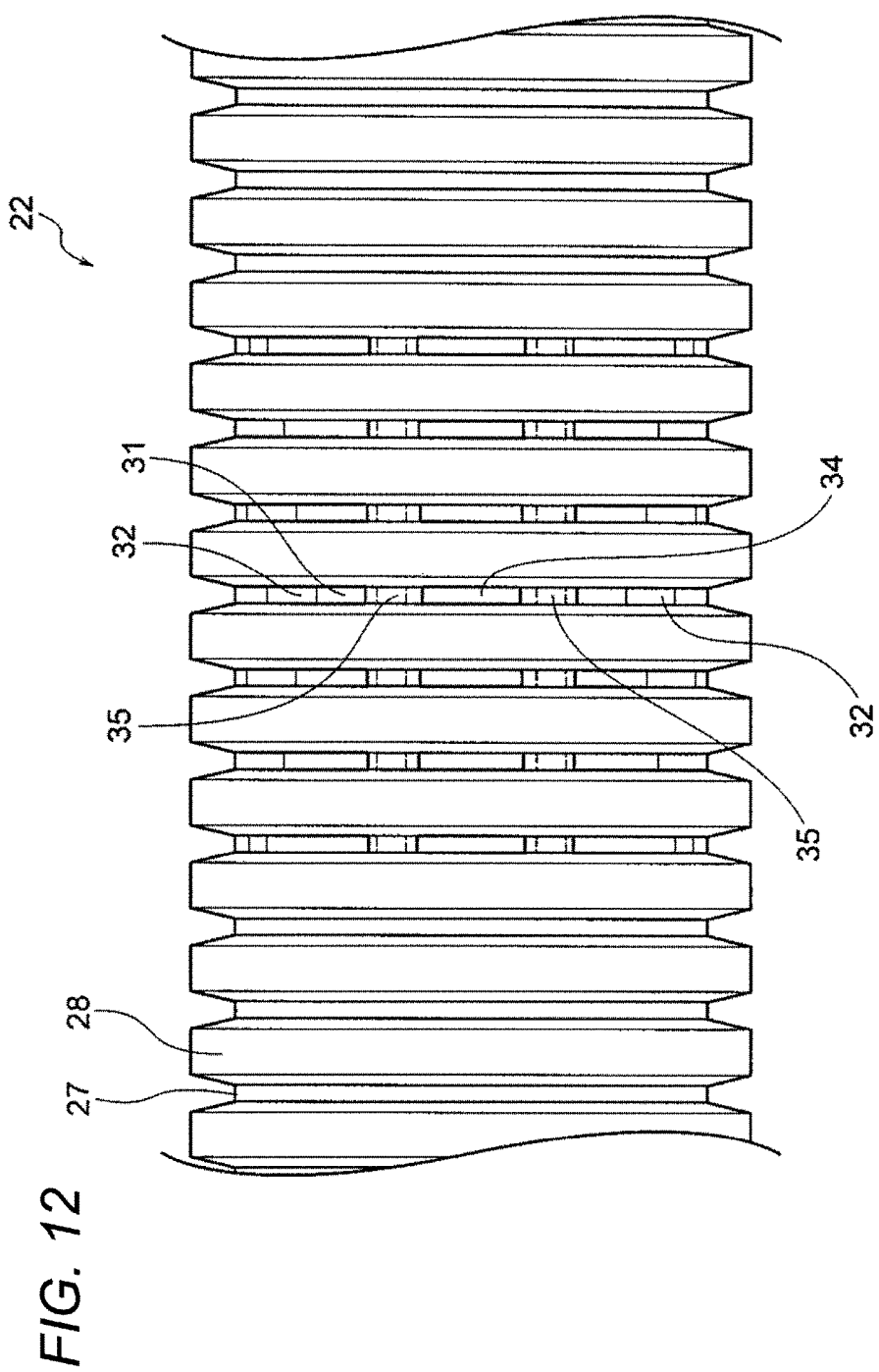
FIG. 12 is a view showing the corrugated tube shown in FIG. 8, as viewed from arrow B (Embodiment 2)

Embodiment 2 will be described below referring to the accompanying drawings. FIG. 8 is a perspective view showing a corrugated tube serving as another example, being cross-sectioned at the position where a deep groove section is formed. Furthermore, FIG. 9 is a view showing the corrugated tube shown in FIG. 8, as viewed from arrow A, FIG. 10 is a cross-sectional view taken on line E-E of FIG. 9, FIG. 11 is a cross-sectional view taken on line F-F of FIG. 10, and FIG. 12 is a view showing the corrugated tube shown in FIG. 8, as viewed from arrow B.

In FIGS. 8 to 12, the corrugated tube 22 is formed into a shape having the recess sections 27 on the outer face of the bellows and having the protruding sections 28 on the outer face of the bellows in the circumferential direction as viewed from the outside and is also formed into a shape in which the recess section 27 on the outer face of the bellows and the protruding section 28 on the outer face of the bellows are alternately arranged continuously in the axial direction of the tube. The recess sections 27 on the outer face of the bellows and the protruding sections 28 on the outer face of the bellows are respectively formed so as to be plural in number. The recess section 27 on the outer face of the bellows is formed so as to have the shape of the protruding section 29 on the inner face of the bellows as viewed from the inside. Furthermore, the protruding section 28 on the outer face of the bellows is formed so as to have the shape of the recess section 30 on the inner face of the bellows as viewed from the inside. The deep groove sections 31 are formed in the corrugated tube 22 configured as described above. The deep groove sections 31 are formed in some of the plurality of recess sections 27 on the outer face of the bellows. In this embodiment, the deep groove sections 31 being seven in number are formed at each deep groove forming position 26 (see FIG. 2) (the number is taken as an example).

The deep groove section 31 is formed into a shape being recessed partially in a predetermined range in the circumferential direction (see the range shown in the figures), protruding more than the protruding section 29 on the inner face of the bellows on the inner side of the corrugated tube 22, and having the pair of tapered sections 32 as viewed from the axial direction of the corrugated tube 22.

Moreover, the seven deep groove sections 31 are formed and disposed so as to be arranged in the axial direction of the corrugated tube 22. The seven deep groove sections 31 configured as described above are formed and disposed so that their depths change gradually in the axial direction of the tube. More specifically, the deep groove sections 31 are formed and disposed in a state in which the their depths are adjusted so that the depths of the first to fourth deep groove sections 31 become gradually larger and so that the depths of the fourth to seventh deep groove sections 31 become gradually smaller. The seven deep groove sections 31 are formed so that the large protruding section 33 is, as it were, generated as viewed from the inside of the corrugated tube 22. The large protruding section 33 functions as a portion for suppressing the deflection of the conductive path 21 (see FIG. 2).

A pair of reinforcing sections 35 having a rib shape as viewed from the outside of the corrugated tube is formed at the deep groove sections 31 according to Embodiment 2. This pair of reinforcing sections 35 is formed so as to extend along the axis of the corrugated tube 22 while having the same distance therebetween (see FIG. 12). The pair of reinforcing sections 35 is formed so as to protrude outside from the circular arc section 34 (see FIG. 8; in this embodiment, the positions of the tip ends of the protrusions are the positions aligned with the locus drawn by the recess sections 27 on the outer face of the bellows). The pair of reinforcing sections 35 is formed as a portion for adjusting the rigidity between the recess sections 27 on the outer face of the bellows provided with the deep groove sections 31 and the other recess sections 27 on the outer face of the bellows not provided with the deep groove sections 31.

Advantages of Embodiment 2

As described above referring to FIGS. 8 to 12, it is found that Embodiment 2 exhibits advantages similar to those of Embodiment 1. That is to say, Embodiment 2 exhibits advantages capable of suppressing the movement of the conductive path 21 because the deep groove sections 31 are formed and capable of preventing the conductive path 21, for example, from being scraped. Furthermore, Embodiment 2 exhibits an advantage capable of reducing the contact load of the conductive path 21 when the conductive path 21 (see FIG. 2) is inserted into the corrugated tube 22 because the pair of tapered sections 32 is formed. In addition, as a unique advantage of Embodiment 2, by forming the pair of reinforcing sections 35, Embodiment 2 exhibits an advantage capable of adjusting the rigidity between the recess sections 27 on the outer face of the bellows provided with the deep groove sections 31 and the other recess sections 27 on the outer face of the bellows not provided with the deep groove sections 31 (for example, capable of adjusting the rigidity so that even the portions provided with the deep groove sections 31 have rigidity (easiness/hardness of bending) equivalent to that of the portions not provided with the deep groove section 31).

Embodiment 3

Figure 13:
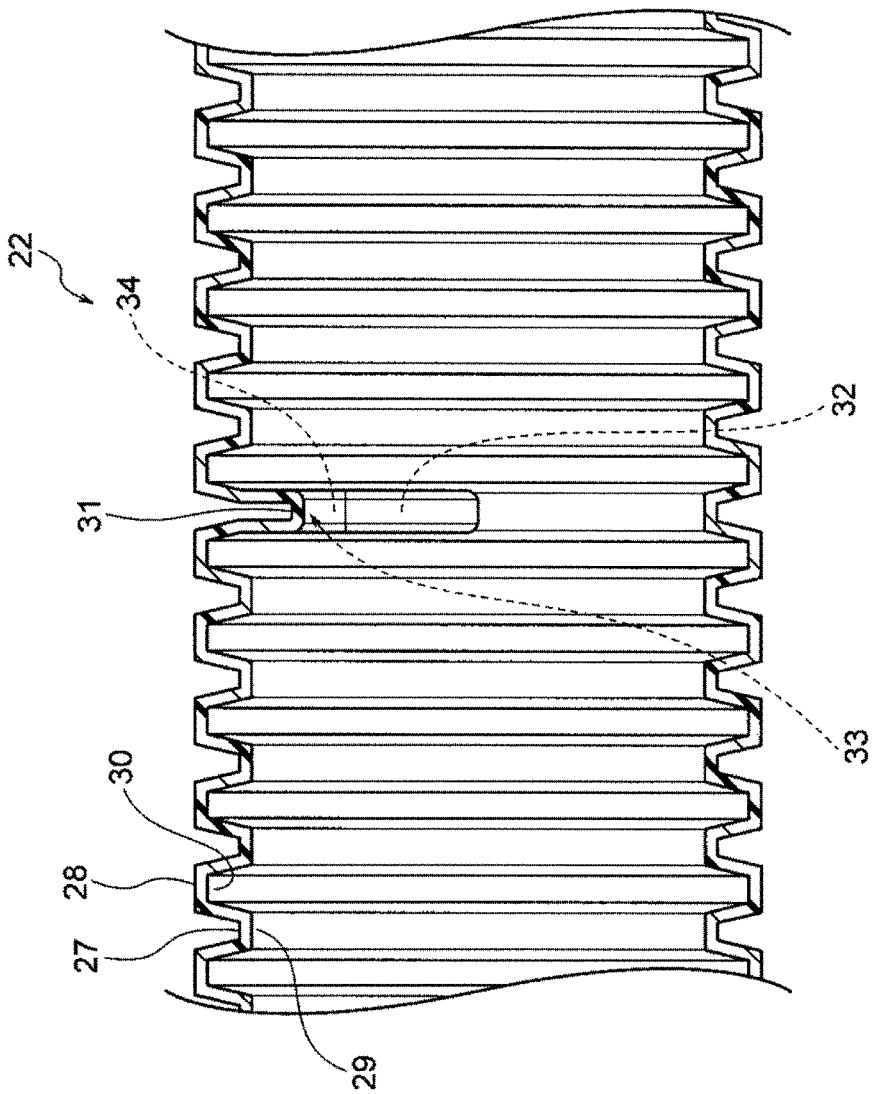
FIG. 13 is a view showing a corrugated tube serving as a still another example, being cross-sectioned along the axis of the corrugated tube (Embodiment 3).

Embodiment 3 will be described below referring to the accompanying drawing. FIG. 13 is a view showing a corrugated tube serving as a still another example, being cross-sectioned along the axis of the corrugated tube. Components basically identical to those according to Embodiment 1 described above are designated by the same reference numerals, and their detailed descriptions are omitted.

In FIG. 13, the corrugated tube 22 according to Embodiment 3 is provided with only one deep groove section 31 according to Embodiment 1. Even in the case that the corrugated tube 22 is provided with only one deep groove section 31, the movement of the conductive path 21 (see FIG. 2) can be suppressed as a matter of course. Furthermore, since the pair of tapered sections 32 is formed, the contact load of the conductive path 21 can be reduced.

In addition to these, the present invention can be modified variously within a range not deviated from the scope of the present invention as a matter of course.

What is claimed is:

1. A corrugated tube comprising:
a tubular body including outer-face bellows recess sections and outer-face bellows protruding sections in a circumferential direction as viewed from an outside, wherein the outer-face bellows recess section and the outer-face bellows protruding section are alternately arranged continuously in an axial direction of the tubular body,
wherein deep groove sections are formed in some of the outer-face bellows recess sections,
wherein each of the deep groove sections has: a shape being recessed partially in a predetermined range in the circumferential direction; a shape protruding toward an inner side of the tubular body; and a shape having a pair of tapered sections as viewed from the axial direction of the tubular body, and
wherein each of the deep groove sections has a closed bottom portion so that inside and outside of the tubular body are not communicated to each other.

2. The corrugated tube according to claim 1, wherein the deep groove sections are arranged in the axial direction of the tubular body, and the deep groove sections are formed and disposed such that depths thereof change gradually in the axial direction of the tubular body.

3. The corrugated tube according to claim 1, wherein the deep groove sections are arranged in the axial direction of the tubular body, and reinforcing sections having a rib shape as viewed from the outside of the tubular body are formed at the deep groove sections.

4. The corrugated tube according to claim 1, where the deep groove sections are disposed zigzag on upper and lower sides of the tubular body along the axial direction.

5. The corrugated tube according to claim 1, where the deep groove sections are disposed on a same side of the tubular body along the axial direction.

6. The corrugated tube according to claim 1, where the deep groove sections are arranged in a spiral shape about the axial direction of the tubular body.

7. A wire harness comprising:
a corrugated tube formed by a tubular body including outer-face bellows recess sections and outer-face bellows protruding sections in a circumferential direction as viewed from an outside, wherein the outer-face bellows recess section and the outer-face bellows protruding section are alternately arranged continuously in an axial direction of the tubular body, and
one or more conductive paths inserted into the tubular body,
wherein deep groove sections are formed in some of the outer-face bellows recess sections in the tubular body, and wherein each of the deep groove section sections has: a shape being recessed partially in a predetermined range in the circumferential direction; a shape protruding toward an inner side of the tubular body; and a shape having a pair of tapered sections as viewed from the axial direction of the tubular body, and wherein each of the deep groove sections has a closed bottom portion so that inside and outside of the tubular body are not communicated to each other.

8. The wire harness according to claim 7, where the deep groove sections are disposed zigzag on upper and lower sides of the tubular body along the axial direction.

9. The wire harness according to claim 7, where the deep groove sections are disposed on a same side of the tubular body along the axial direction.

10. The wire harness according to claim 7, where the deep groove sections are arranged in a spiral shape about the axial direction of the tubular body.

11. The wire harness according to claim 7, wherein the deep groove sections are arranged in the axial direction of the tubular body, and the deep groove sections are formed and disposed such that depths thereof change gradually in the axial direction of the tubular body.

12. The wire harness according to claim 7, wherein the deep groove sections are arranged in the axial direction of the tubular body, and reinforcing sections having a rib shape as viewed from the outside of the tubular body are formed at the deep groove sections.

* * * * *